March 29, 1932.   H. F. KEIL   1,851,012
BURR REMOVER
Filed Jan. 10, 1927
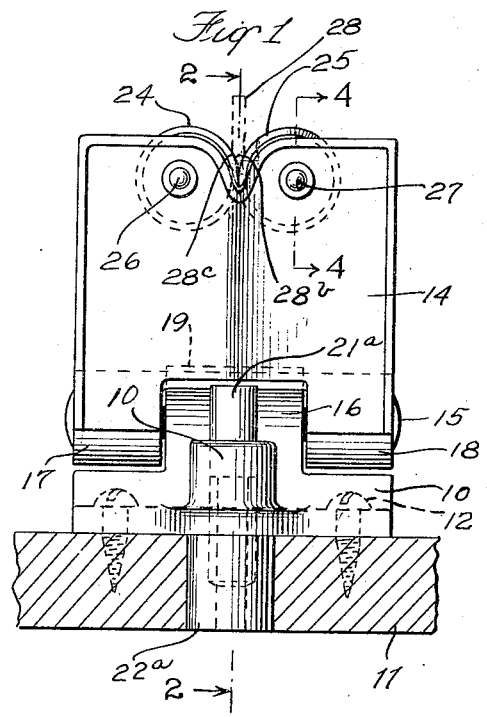
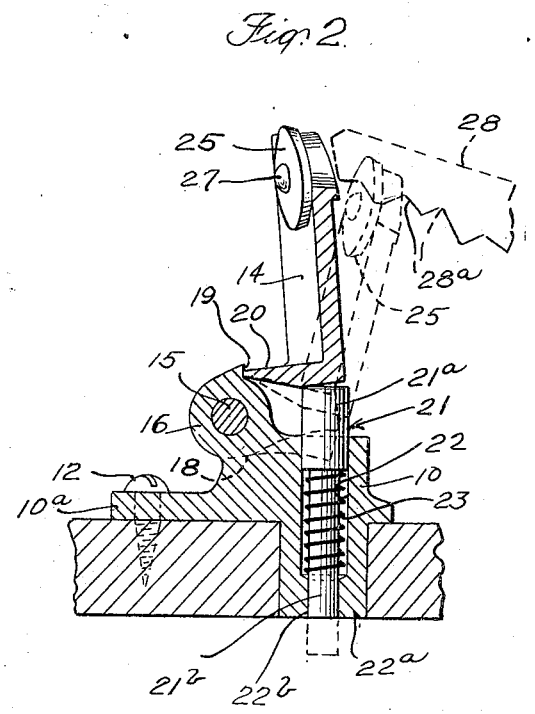
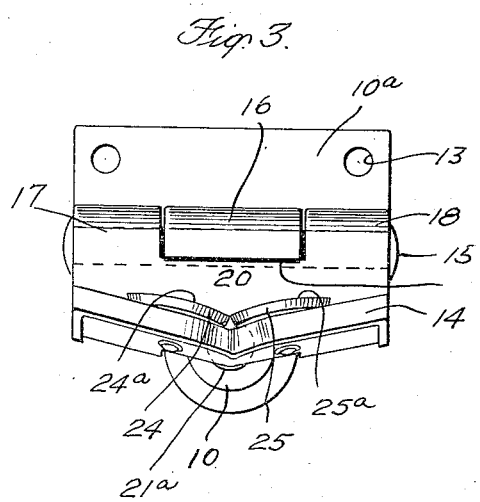
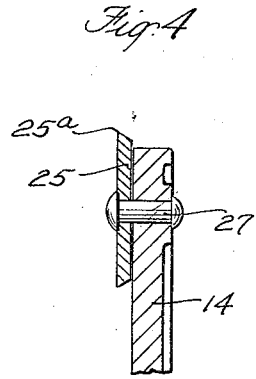
Henry F. Keil INVENTOR
BY
Robert S. Blair ATTORNEY Patented Mar. 29, 1932

1,851,012

UNITED STATES PATENT OFFICE

HENRY F. KEIL, OF SCARSDALE, NEW YORK, ASSIGNOR TO FRANCIS KEIL & SON, INC., A CORPORATION OF NEW YORK

BURR REMOVER

Application filed January 10, 1927. Serial No. 160,163.

This invention relates to burr removers and with regard to its more specific features to a device for removing roughness or burrs from keys or the like.

One of the objects of the invention is to provide a device of the above nature which is practical and efficient. Another object is to provide a device which will quickly and efficiently cut down or smooth the edges of an implement having an irregular surface or edge such, for example, as a key. Another object is to provide a device capable of quickly and evenly removing from the edges of a key the burrs or rough projections left by the key cutting process. Another object is to provide a device of the above nature which is simple and inexpensive. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown one of the various possible embodiments of this invention, Figure 1 is a front elevation;

Figure 2 is a section taken along the line 2—2 of Figure 1 and showing in dotted lines the device in operation;

Figure 3 is a top plan view, and

Figure 4 is a section taken along the line 4—4 of Figure 1.

Similar reference characters refer to similar parts throughout the several views of the drawings.

Referring now to the drawings in detail, there is shown a suitable base 10 which is preferably a metal casting and which may be secured to any desired support or table 11 by means of screws or other suitable fastening devices 12. Preferably the base 10 has a flanged portion 10a which gives it a firm stance upon the support and which is provided with openings 13 to accommodate the screws 12 or bolts.

Supported upon the base 10 is a frame construction 14 which carries a cutting or abrading device. The frame 14 preferably takes the form of a substantially upright member which is pivoted at its lower end in the base 10 and about a horizontal pivot pin 15. For convenience of description, the side of the device seen in Figure 1 will be termed the front or forward side. The pivot pin 15 passes through an upwardly projecting lug 16 of the base 10 and through a pair of lugs 17 and 18 which project rearwardly from the bottom portion of the support or frame 14. The frame 14 is thus, as viewed from the side, substantially L-shaped with the pivot pin passing through the rearwardly extending short arm of the L.

As shown in Figure 2, the lug 16 of the base is provided with a shoulder 19 and, between the two lugs 17 and 18, the part 20 of the frame 14 is shaped to coact with this shoulder 19 to limit the rearward swinging of the frame 14 about the pivot 15.

Suitable resilient means is provided for normally holding the frame 14 against the stop 19. This means preferably takes the form of a plunger 21 which is slidably mounted in an opening 22 of the base and which is urged upwardly by a spring 23, the spring 23 being positioned within the opening 22 about the plunger and being thereby concealed from view. The upper end of the plunger 21 engages the lower end of the frame 14 adjacent its front edge and the upward pressure of the spring continually tends to swing the frame about the axis 15 in a counter-clockwise direction, as viewed in Figure 2, and normally holds the frame against the stop 19. Preferably, when the part 20 is in engagement with the stop shoulder 19, the frame 14 is inclined slightly rearwardly.

The cutting or abraiding device is supported at the upper end of the frame 14 and preferably takes the form of a pair of opposed cutting devices 24 and 25 between which the implement to be operated upon is drawn. These devices, as shown in the drawings take the form of hardened steel disks having opposed cutting edges 24a and 25a. The disks 24 and 25 are rotatably mounted upon pins 26 and 27 respectively so that they may be rotated and thereby bring into operative position any portion of their cutting edges. As is seen in Figure 2, the frame 14 is preferably concave on its rear surface and the two disks 24 and 25 are mounted against the two oppositely sloping portions of this surface so that their axes are not parallel. This brings the cutting edges 24a and 25a into position for most efficient coaction.

This apparatus is of particular advantage for removing burrs from the square edges of keys after the keys have been cut, but it is to be understood that the features of this invention may be used to advantage in other fields. Referring now to Figures 1 and 2, there is shown in dotted lines a key 28 being operated upon by this device. The key has been cut to form therein the notches 28a, and this cutting operation ordinarily leaves upon the side edges 28b and 28c (Figure 1) rough projecting burrs. The irregular edge of the key renders it extremely difficult, if not impossible, to satisfactorily remove these burrs with any of the devices generally in use.

With the apparatus disclosed herein, the key is placed in position between the two disks 24 and 25, as shown in the drawings, and is then drawn therebetween in a forward direction and with a downward pressure. The forward pull and slight downward pressure swing the frame 14 forwardly about the pivot pin 15 against the action of the spring 23, the frame swinging into a position such as that shown in dotted lines in Figure 2. Thereafter, as the key is drawn through between the cutting or abrading edges 24a and 25a, the spring holds the cutter with a yielding pressure against the key edges. As the irregular surface of the key is drawn between the cutting edges, the frame 14 swings back and forth about its pivot. In spite of the irregular shape of the key surface, the key is drawn through quickly and smoothly and every portion of the edges 28b and 28c are acted upon by the cutters and evenly smoothed off. The key does not bind or jam between the cutting edges and the rough surfaces thereof are smoothed off quickly and with the greatest convenience.

From the foregoing, it will be seen that there is herein provided a device which achieves the objects of this invention and accomplishes advantages of distinct practical value. The device is strong and rugged, without parts which will wear out quickly or become disarranged and, moreover, the construction is simple and inexpensive to build.

In this latter connection, it is to be noted that the recess 22 is preferably substantially cylindrical and may be conveniently formed as by drilling; the bottom wall 22a of the recess 22 has drilled therethrough a hole indicated at 22b, concentric with the bore of the opening 22 but preferably of lesser diameter. The plunger generally indicated at 21 is shaped to provide an upper portion 21a adapted to be slidably received into the larger bore or into the opening 22 while the lower portion 21b of the plunger 21 is of lesser diameter and is slidably receive into the opening 22b in the bottom wall 22a.

The spring 23 surrounds the portion 21b of the plunger 21 and its coils or turns are received in the space between the portion 21b of the plunger and the walls of the recess 22. The upper end of the spring 23 abuts against the enlarged portion 21a of the plunger 21 and the lower end of the spring abuts against the end wall 22a. Thus, the spring is compactly housed while the plunger 21 is supported for highly efficient and ready sliding action. Moreover, the parts will be seen to be capable of rapid assembly.

In assembling the several parts of the device, the plunger 21 with the spring 23 thereabout is first inserted into the opening 22; the substantially L-shaped frame 14 is thereupon positioned so that the lugs 17 and 18 of the frame 14 and the lug 16 of the base 10 are so alined that the pivot pin 15 may be passed through the apertures in these lugs. The assembly of the frame 14 to the base member 10 will thus be seen to effect first the desired positioning of the lower and forward portion of the frame 14 with respect to the plunger 21 and secondly a locking of the plunger 21 against withdrawal thereof from the recess 22, as will be clearly seen from Figure 2. The portion 20 of the frame 14, in coacting with the stop or shoulder 19 on the lug 16 of the frame 10, prevents the frame 14 from being swung in counter-clockwise direction, as viewed in Figure 2, to such an extent as to permit the withdrawal of the plunger 21 from the base 10. There is thus achieved not only convenient and rapid assembly of the device, but also highly effective action and nicety of operation when in use.

It will thus be seen that there has been provided in this invention an apparatus in which many thoroughly practical advantages are successfully achieved. It will, moreover, be seen that the apparatus is of durable and rugged construction throughout, is of efficient action, and well adapted to meet the varying conditions of hard practical use.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim as my invention:

1. In a device of the class described, in combination, a base, a supporting frame pivotally mounted upon said base, a pair of opposed cutting devices mounted upon said frame and adapted to cut the two sides of an implement drawn therebetween, said frame being adapted to swing about its pivot when an implement is pressed against said cutting devices, and spring means between said frame and said base acting in opposition to said swinging.

2. In a device of the class described, in combination, a base, a substantially upright supporting frame mounted upon said base and pivoted thereon adjacent its lower end about a substantially horizontal axis, a pair of opposed cutting devices mounted in the upper portion of said frame and adapted when an implement is drawn therebetween in one direction to cut the two sides thereof, said frame being adapted to swing about its pivot in a corresponding direction as said cuttting action takes place, a stop for limiting the swinging of said frame in the opposite direction, and spring means normally holding said frame against said stop.

3. In a device of the class described, in combination, a base, a substantially upright supporting frame mounted upon said base and pivoted thereon adjacent its lower end about a substantially horizontal axis, a device having a cutting edge and mounted in the upper portion of said frame and adapted when an implement is drawn thereacross in one direction to cut the two sides thereof, said frame being adapted to swing about its pivot in a corresponding direction as said cutting action takes place, a stop for limiting the swinging of said frame in the opposite direction, a plunger slidably mounted in an opening in said base adjacent to said frame, and a spring urging said plunger against said frame and normally holding said frame against said stop.

4. In a device of the class described, in combination, a base, a supporting frame, cutting means mounted upon said frame and adapted to act upon the two sides of an implement pressed into engagement therewith and drawn thereacross, means mounting said frame upon said base for movement thereon under the urge of said implement, and means acting against said movement comprising a plunger slidably mounted in an opening in said base, and a spring about said plunger and concealed within said recess and urging said plunger outwardly against said frame.

5. In a device of the class described, in combination, a base, a supporting frame, cutting means mounted upon said frame and adapted to act upon the two sides of an implement pressed into engagement therewith and drawn thereacross, means mounting said frame upon said base for movement thereon under the urge of said implement, spring means acting against said movement comprising a spring pressed member slidably mounted in said base and bearing against said frame, and means for limiting the movement of said frame under the urge of said spring means, said last means, in conjunction with said frame, locking said spring pressed member against removal from said base.

6. In a device of the class described, in combination, a base, a supporting frame, cutting means mounted upon said frame and adapted to act upon the two sides of an implement pressed into engagement therewith and drawn thereacross, a pivotal connection between said frame and said base, a member slidably mounted in a recess in said base, a spring urging said slidable member outwardly against a portion of said frame and tending to swing said frame about its pivot, and a stop for limiting said swinging movement, said frame thereby holding said slidable member from being expelled from said recess by said spring.

7. In a device of the class described, in combination, a rigid device having a cutting edge substantially V-shaped, means mounting said device for movement in substantially the direction in which an implement, pressed into said V-shaped cutting edge, is drawn across the latter, resilient means acting to oppose said movement of said device, and means limiting the range of movement of said device.

8. In a device of the class described, in combination, a support, a device having a cutting edge and pivotally mounted upon said support, spring means urging said device to swing in one direction relative to said support, a stop for limiting the extent to which said device swings under the urge of said spring means, said spring means having such a tension that, when an implement having an irregular edge has the latter pressed against said cutting edge and drawn across the latter in a direction to swing said device in the other direction relative to said support, said spring means permits the device to yieldingly move under the urge of said implement, and means for limiting the extent to which said device may swing against the tension of said spring.

9. In a device of the class described, in combination, a supporting frame, a pair of opposed cutting members mounted upon said frame and adapted to act respectively upon the side edges of a notched face of a key when the latter is drawn therebetween, a base, means mounting said frame upon said base for movement thereon in the direction in which said key is drawn across said cutting members, and spring means interposed between said frame and said base, acting in opposition to said movement of said frame, and permitting said frame and said cutting members to move relatively into the successive notches of said key as the latter is drawn across said cutting members.

10. In a device of the character described, in combination, a substantially L-shaped frame having a substantially V-shaped cutting edge adjacent the upper end of its vertical arm, a base, means pivotally connecting the upper end of the substantially horizontal arm of said frame to said base, and spring means interposed between said substantially horizontal arms and said base.

11. In a device of the character described, in combination, a rigid frame member having a substantially V-shaped cutting edge at one end thereof, a base, means pivotally connecting said frame member to said base at the other end of said frame member, and spring means interposed between said base and an intermediate portion of said frame member for yieldingly opposing movement of said frame member about its pivot under the urge of an implement drawn across said cutting edge.

12. In a device of the character described, in combination, a device comprising a metal member having a cutting edge across which an implement may be drawn, a base having a depressed portion adapted to enter a recess in a table or the like to which said base may be secured, means mounting said device upon said base for movement thereof under the urge of an implement drawn across and against said cutting edge, and spring means housed in said depressed portion for opposing movement of said device.

13. In a device of the character described, in combination, a device provided with cutting means across which an implement having a susbtantially serrated edge may be drawn, a supporting member, and means including a yieldable portion for mounting said device for relative bodily movement at susbtantial amplitude toward and away from said supporting member, the tension of said yieldable member being insufficient to prevent movement of said device toward said supporting member under the urge of said implement and sufficient to cause said device to move in a direction away from said supporting member and into depressions in the substantially serrated edge of said implement, said means including a pivotal connection between said device and said supporting member, said yieldable portion acting to control said movements of said device about the axis of the pivotal connection.

In testimony whereof, I have signed my name to this specification this 31st day of December, 1926.

HENRY F. KEIL.